(12) United States Patent
Schuetz (10) Patent No.: US 11,826,218 B2
(45) Date of Patent: Nov. 28, 2023

(54) DEVICE FOR MOVING A TOOTH OR GROUP OF TEETH

(71) Applicant: Winfried Schuetz, Munich (DE)

(72) Inventor: Winfried Schuetz, Munich (DE)

( * ) Notice: Subject to any disclaimer, the term of this patent is extended or adjusted under 35 U.S.C. 154(b) by 80 days.

(21) Appl. No.: 17/212,142

(22) Filed: Mar. 25, 2021

(65) Prior Publication Data

US 2021/0338378 A1 Nov. 4, 2021

(30) Foreign Application Priority Data

Mar. 25, 2020 (DE) .............................. 102020001935

(51) Int. Cl.
*A61C 7/00* (2006.01)

(52) U.S. Cl.
CPC ...................................... *A61C 7/00* (2013.01)

(58) Field of Classification Search
CPC ........... A61C 7/00; A61C 8/0096; A61C 7/10; A61C 7/28; A61C 7/22; A61C 7/02; A61C 3/00
See application file for complete search history.

(56) References Cited

U.S. PATENT DOCUMENTS

| | | | | |
|---|---|---|---|---|
| 5,002,485 A * | 3/1991 | Aagesen | .................. | A61C 7/00 433/7 |
| 5,007,828 A * | 4/1991 | Rosenberg | ............... | A61C 7/00 433/7 |
| 5,064,370 A * | 11/1991 | Jones | ....................... | A61C 7/00 433/21 |
| 5,647,743 A * | 7/1997 | Schmitt | ..................... | A61C 7/18 433/22 |
| 5,785,520 A * | 7/1998 | Carano | ..................... | A61C 7/00 433/7 |
| 5,873,715 A * | 2/1999 | Liou | ......................... | A61C 7/00 433/7 |
| 5,904,479 A * | 5/1999 | Staples | ..................... | A61C 7/10 433/7 |
| 6,217,323 B1 * | 4/2001 | Liou | ....................... | A61C 7/282 433/7 |
| 7,331,781 B1 * | 2/2008 | Bandeen | .................. | A61C 7/10 433/7 |
| 11,234,795 B2 * | 2/2022 | Schuetz | ................... | A61C 7/22 |
| 2003/0031975 A1 * | 2/2003 | Voudouris | ................ | A61C 7/12 433/11 |
| 2003/0050641 A1 * | 3/2003 | Mommaerts | ............. | A61C 7/10 606/328 |

(Continued)

FOREIGN PATENT DOCUMENTS

| | | | | |
|---|---|---|---|---|
| DE | 202010008972 U1 * | 5/2011 | ............... | A61C 7/00 |
| DE | 102015014991 A1 * | 6/2017 | | |

*Primary Examiner* — Heidi M Eide
*Assistant Examiner* — Lina Faraj
(74) *Attorney, Agent, or Firm* — Morris Law Group; Robert W. Morris (57) ABSTRACT

The invention is a device for moving a patient's tooth or related group of teeth. It is comprised of a housing which is fastened onto a base arch within the patient's oral cavity and which includes an adjuster which is connected to a palatal lock on the tooth to be moved using the adjuster. The base arch originates at a fixed jaw implant and is inserted into a channel in the housing which is freely accessible from outside and securely clamped using a lock connected to the housing, preferably a turn-type lock with a threaded shaft by tightening the threaded shaft.

9 Claims, 7 Drawing Sheets

(56) References Cited

U.S. PATENT DOCUMENTS

| | | | |
|---|---|---|---|
| 2003/0091952 A1* | 5/2003 | Bowman | A61C 7/10 433/7 |
| 2003/0170585 A1* | 9/2003 | Wilkerson | A61C 7/22 433/17 |
| 2004/0110108 A1* | 6/2004 | Weissbach Otte | A61C 7/10 433/18 |
| 2004/0214126 A1* | 10/2004 | Forster | A61C 7/10 433/7 |
| 2004/0265769 A1* | 12/2004 | Inman | A61C 7/10 433/21 |
| 2006/0024636 A1* | 2/2006 | Bowman | A61C 7/00 433/18 |
| 2008/0020339 A1* | 1/2008 | Papadopoulos | A61C 7/00 433/21 |
| 2008/0072915 A1* | 3/2008 | Nelissen | A61F 5/566 128/848 |
| 2008/0254401 A1* | 10/2008 | Yazdi | A61C 7/22 433/18 |
| 2009/0035715 A1* | 2/2009 | Cleary | A61C 7/36 433/17 |
| 2009/0142723 A1* | 6/2009 | Govaert | A61C 7/36 433/7 |
| 2011/0039225 A1* | 2/2011 | Hagelganz | A61C 7/14 433/17 |
| 2011/0165532 A1* | 7/2011 | Benvegnu' | A61C 7/287 433/18 |
| 2013/0157214 A1* | 6/2013 | Chen | A61C 7/145 433/11 |
| 2013/0252195 A1* | 9/2013 | Popat | A61C 7/10 433/7 |
| 2015/0056566 A1* | 2/2015 | Moon | A61C 7/10 433/7 |
| 2016/0100914 A1* | 4/2016 | Buddemeyer | A61C 7/02 433/7 |
| 2016/0120622 A1* | 5/2016 | Montalban | A61C 7/10 433/7 |
| 2016/0270884 A1* | 9/2016 | Yousefian | A61C 7/10 |
| 2017/0290643 A1* | 10/2017 | Giardino | A61C 7/10 |
| 2018/0311014 A1* | 11/2018 | Yousefian | A61C 7/10 |
| 2019/0343675 A1* | 11/2019 | Giridharagopalan | A61F 5/56 |
| 2020/0093577 A1* | 3/2020 | Cosse | A61C 7/14 |
| 2022/0054233 A1* | 2/2022 | Stainsby | A61C 7/22 |

* cited by examiner

DEVICE FOR MOVING A TOOTH OR GROUP OF TEETH

INTRODUCTION

The invention is a device for moving a patient's tooth or related group of teeth by means of an orthodontic function module.

Such a device is described in the unpublished patent application DE102019006212.4 and is designated as a function module as it can be used to carry out multiple functions. The function module has an adjuster to move the tooth, which is housed in a casing attached to a base arch inside the patient's oral cavity, resulting in a fixed jaw implant in the anterior palatal area. The base arch, a strong wire, is contained within a hole bored through the housing of the function module, on which the housing is shifted distally, i.e. from the posterior palate, and fixed in the desired final position. This fitting requires precision and is quite cumbersome and time-consuming.

The adjuster of the function module has a rigid connection e.g. of medical steel to a lock with a square lumen or square tube, what is referred to as a palatal lock, which is attached to the tooth to be moved, usually a molar. The connection ends in a corresponding square end cap. This is custom-inserted into the square tube of the palatal lock. The connection between the connector and lock is usually secured with a wire ligature. The ligature must be bound tightly. However, it can loosen in the course of the procedure such that a detachment of this connection cannot be ruled out. This has a negative impact on function and reliability.

The primary task of the invention is to simplify the connection of the function module with the base arch and the lock as well as the assembly of the function module with its housing.

This task is solved by the features of Patent claim 1.

Additional configurations of the invention are described by the subclaims.

An essential feature of the invention is that the housing of the function module includes a channel. The channel corresponds to the current borehole, but is freely accessible for insertion and mounting of the base arch and, in some embodiments, may no longer be a borehole through the housing. Thus, the housing does not have to be inserted distally to the base arch in a cumbersome manner but can instead be inserted at any desired position along the base arch by opening it.

To facilitate insertion of the base arch into the channel, it can be expanded in a funnel shape at its opening.

The housing of the function module is fastened into its position on the base arch by a pivoting or twistable bolt or turn-type lock which, when in closed position, at least partially covers the inserted base arch and clamps the base arch in its final position in the channel using a press surface on the lock. This lock is preferably constructed in an L-shape whereby the one side or arm constitutes the press surface and the other is a threaded shaft with metric threads.

Preferably, the lock in the housing can be adjusted for height by turning a clamping nut that conforms with the threaded shaft, which is stored in a corresponding recess of the housing or axially directly on the housing such that it can be turned freely. The thread of the threaded shaft is thereby fastened as a part of the lock and at the same time the press surface is pressed against the base arch.

In the open position, the arm with the press surface lies in a position e.g. defined by a stop parallel to the way in which the channel runs, whereby it is released.

After the base arch has been inserted, the arm of the lock pivots by turning the threaded shaft from the open position by 90 degrees up to a second end stop. I this position the channel is capped and the base arch is thereby held in the channel. To fasten the housing so that it is immovable, the threaded shaft is then tightened by turning the clamping nut until the press surface of the lock attains the necessary surface pressure.

The side of the arm of the lock turned against the base arch is the press surface, which preferably always has a recess whose shape conforms to the outside shape of the base arch such that it is stabilized in its position and overall forms a large pressing surface.

In order to move the base arch as close to the channel as possible when fastening the housing and to make it easier to insert into the channel, an auxiliary device may be used which exerts force on the base arch towards the channel and at least temporarily holds the base arch before it is finally clamped into the channel.

The auxiliary device is e.g. an elastic or elastic module, in the simplest case an O-ring (what is referred to as elastic), which is stretched between the mounting bracket of the housing and the base arch and threaded onto the channel in this direction.

The auxiliary device can also be a correspondingly shaped, twistable arm or plate that is connected with its threaded shaft e.g. as an arm of the turn-type lock. There is an ascending coil on the arm or plate which, when the threaded shaft is turned, initially lies against the base arch and then moves approximately on the vertical towards the channel.

As mentioned above, the base arch is then clamped immovably.

The connection of the housing of the function module to the base arch is thereby completed.

The connection to the tooth to be moved depends on the adjuster within the housing of the function module, e.g. an abutment of a threaded rod with which the movement of the tooth is adjusted; the connection preferably has a square end cap which is inserted with a custom fit into a tube of the lock. The part of the end cap which protrudes beyond the lock is extended by a thin, tapered end piece which is bent sharply at the end of the tube after insertion, thereby rendering the position of the end cap and thus the position of the connection to the housing of the function module immovable and securely fastened. An additional ligature is not needed.

The adjuster for the tooth or group of teeth to be moved is a linear actuator, e.g. a threaded spindle warehoused in the housing or a worm gear unit.

BRIEF DESCRIPTION OF THE DRAWINGS

The invention is illustrated in more detail by the drawings. Shown there.

DETAILED DESCRIPTION

Figure 1:
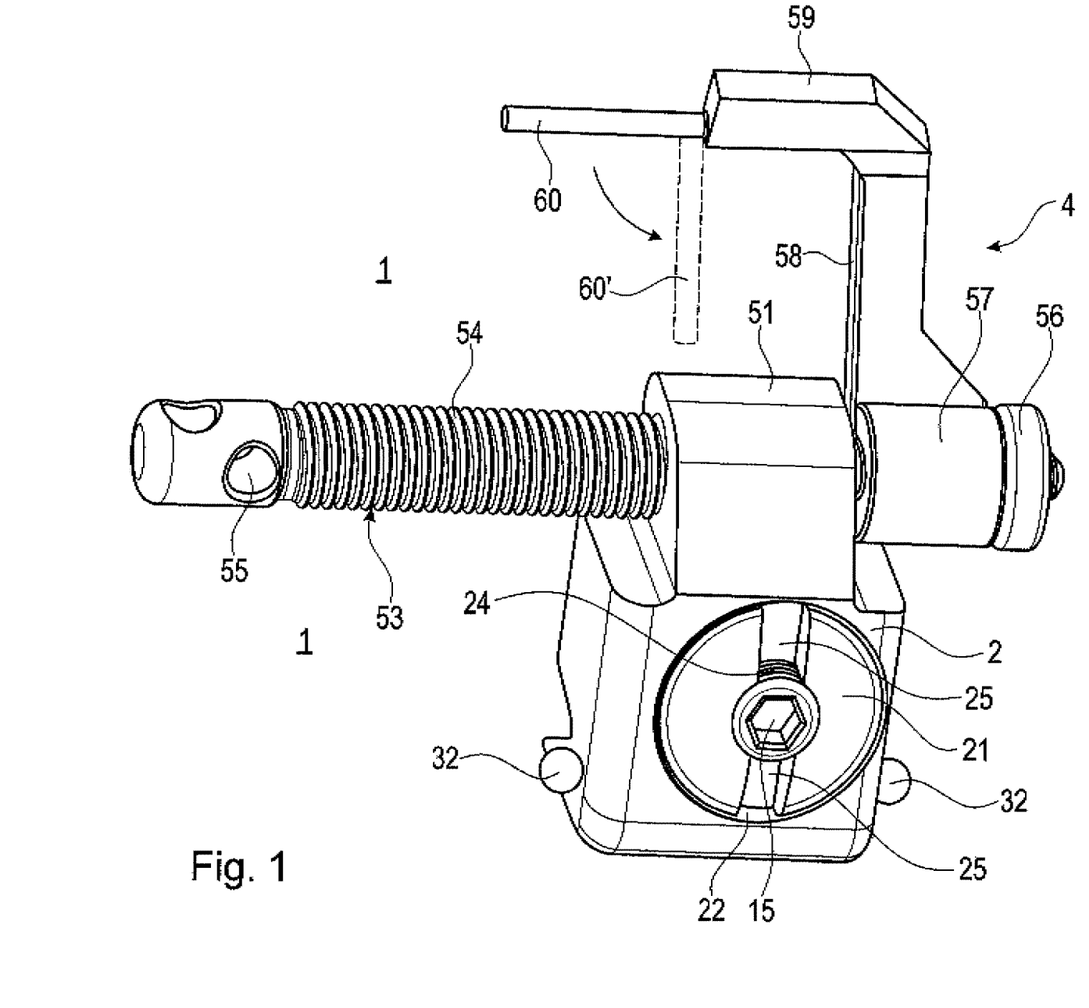
FIG. 1: a perspective view of the top of a function module with a connection to a tooth to be moved.
Figure 2:
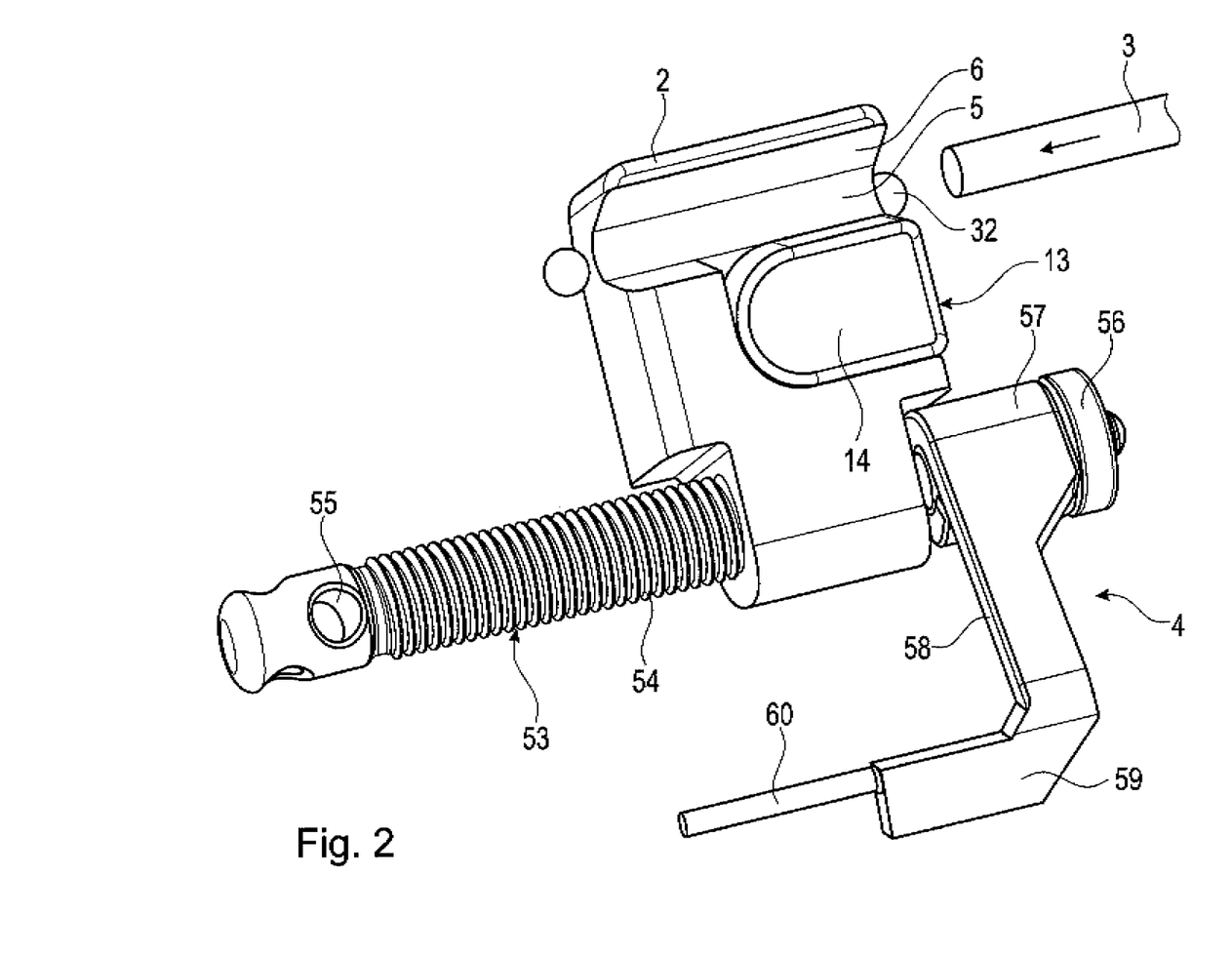
FIG. 2: a perspective view of the bottom of the function module, with a turn-type lock and a channel for accommodating a base arch, in the open position of the turn-type lock.
Figure 3:
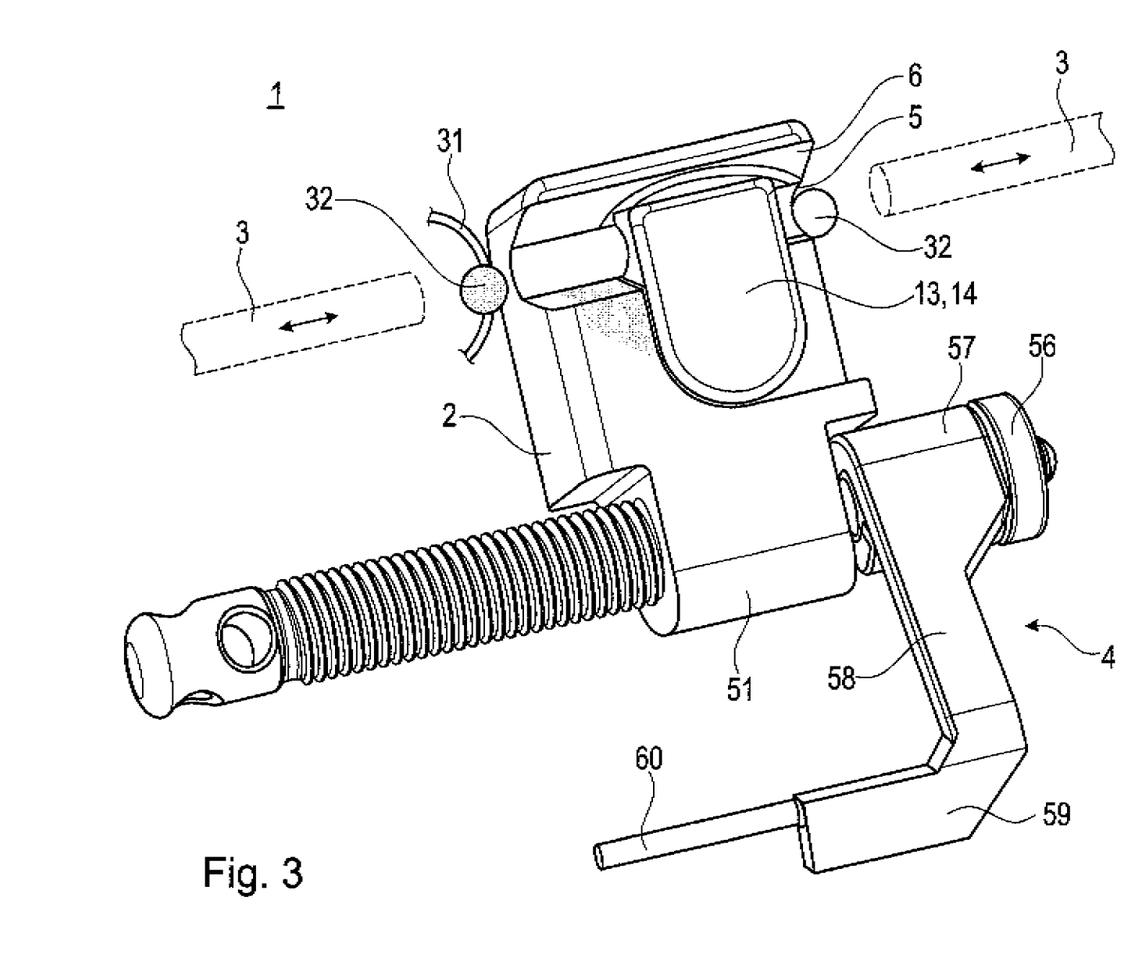
FIG. 3: the view pursuant to FIG. 2 in the closed position of the turn-type lock for attaching the function module to a base arch only indicated here.
Figure 4:
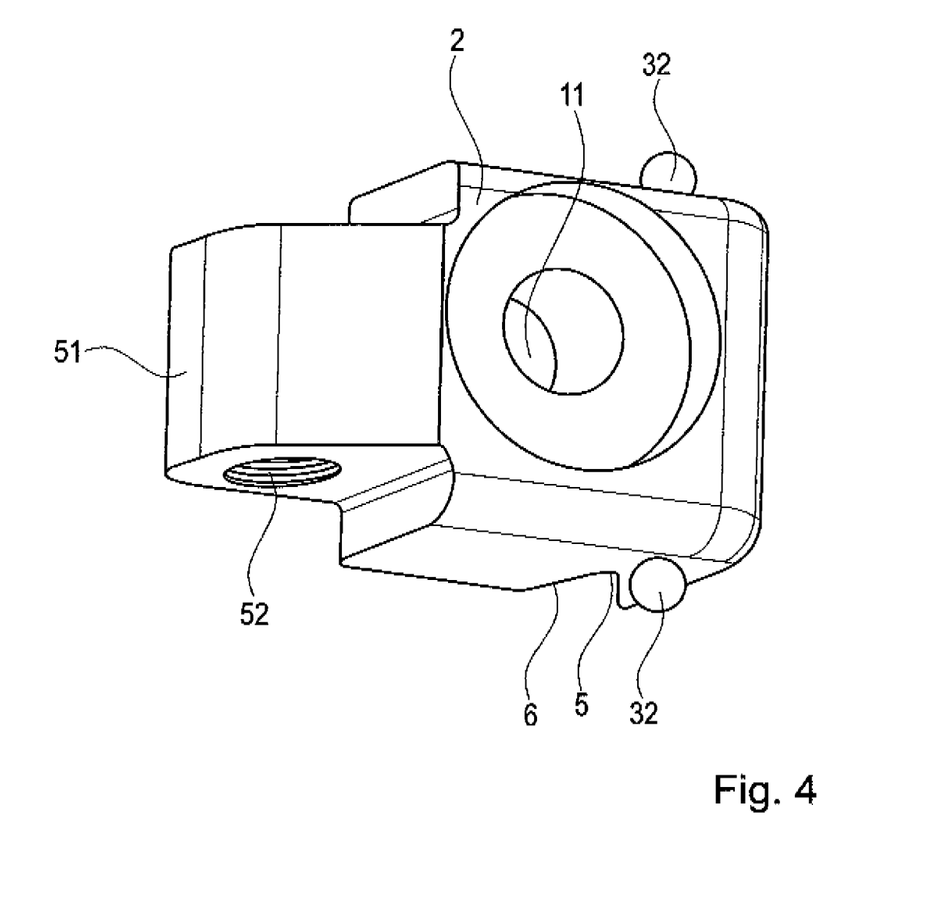
FIG. 4: a perspective view of the housing of the function module.

In FIG. 1 to FIG. 3, a function module 1 for moving a molar is shown with a rectangular housing 2 which is secured within the oral cavity of a patient on a base arch 3 only indicated in FIGS. 2 and 3.

Figure 7:
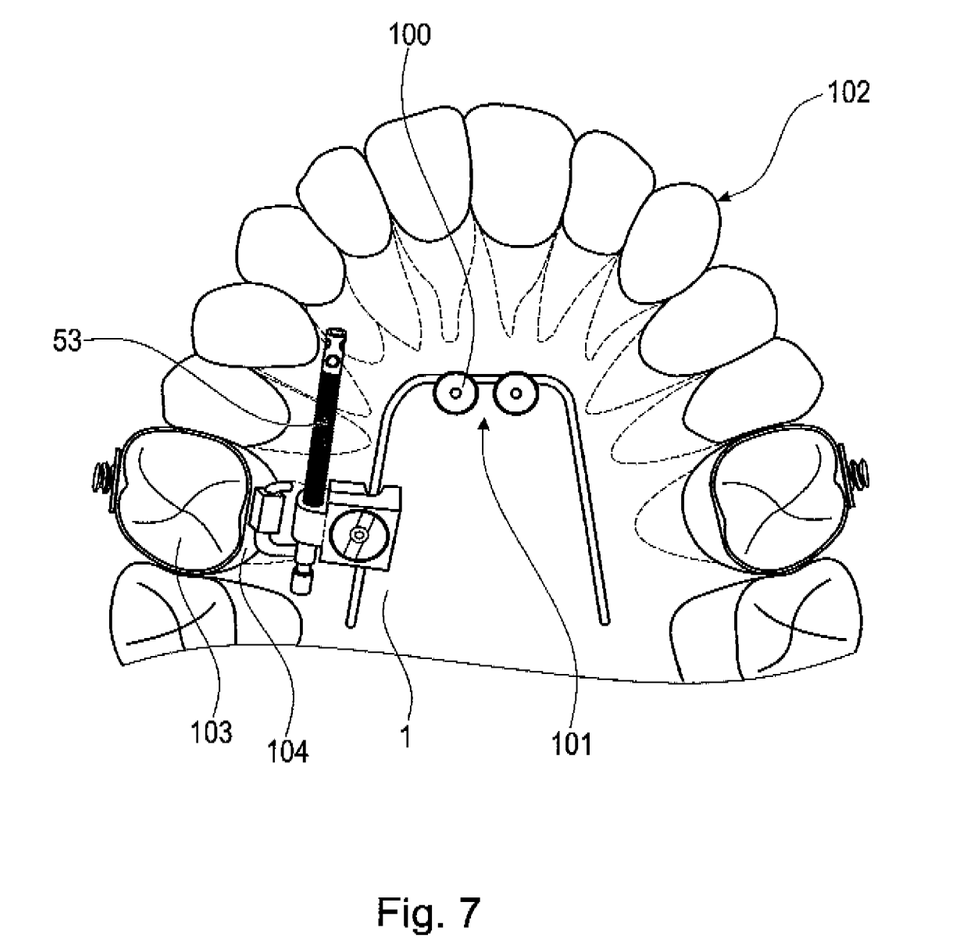
FIG. 7: a schematic illustration of the position of the function module in the upper jaw.

The position of function module 1 in the jaw is shown in FIG. 7. The base arch 3 runs in a U-shape along the tooth chain and is secured by a connection between the two U-arms with screws 100 to a fixed jaw implant 101 in the jawbone in the area of the anterior teeth 102 and runs roughly parallel to the dental arch. The function module 1 is secured to an arm of the base arch 3 in the area of a molar to be moved 103. For clarity, the position of the function module 1 is rotated in the image plane; the surface shown in reality lies approximately parallel to the inner surfaces of the teeth 102.

Shown schematically is another threaded spindle 53 warehoused in the housing of the function module and the connection 4 to a molar 103 to be moved which is outfitted in the usual manner with a palatal lock 104 in which the connection 4 engages, as explained in more detail below.

The housing is approximately 10 millimeters (mm) high, approximately 8 mm wide and approximately 4 mm deep; the base arch has a diameter of roughly 1.1 mm. The housing is rounded off on all corners to prevent irritation of the oral cavity or any injury.

A freely accessible channel 5 is provided on the bottom of the housing 2 parallel to its edge in which base arch 3 can be inserted with a custom fit. To facilitate the insertion, the channel has a funnel-shaped expansion 6.

Figure 5:
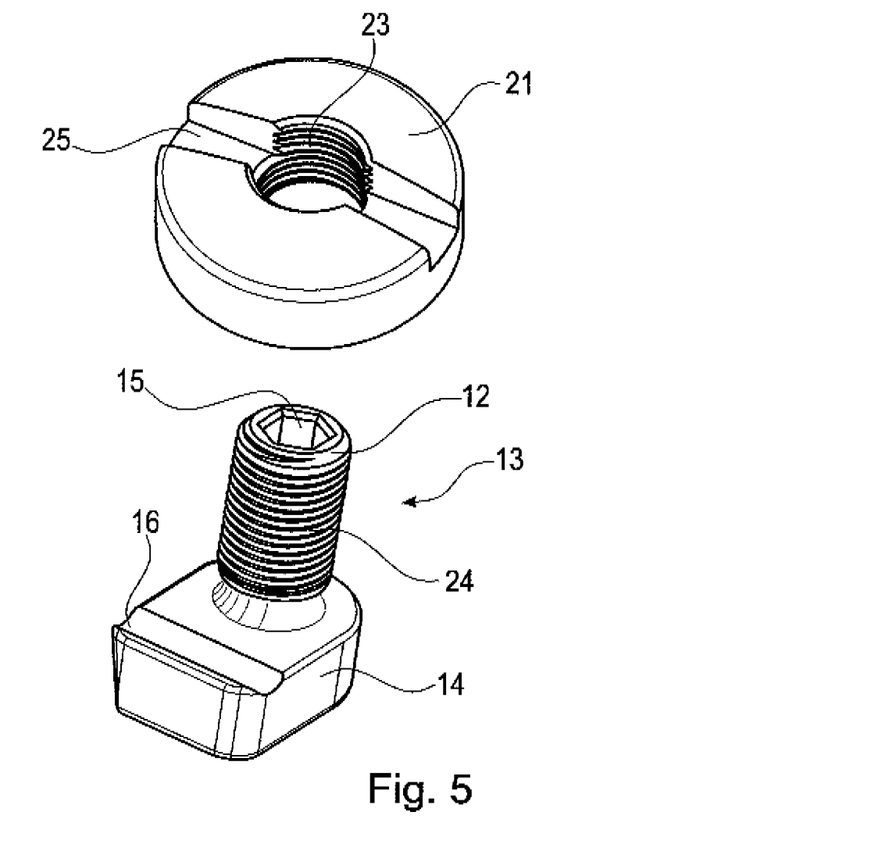
FIG. 5: a perspective illustration of the turn-type lock and a clamping nut for establishing it within the housing of the function module.

The housing 2 has a central borehole 11 perpendicular to its surface and perpendicular to channel 5 into which a threaded shaft 12 of a turn-type lock 13 can be inserted. The turn-type lock 13 is shown in FIG. 5 and on the bottom of the threaded shaft 12 has an arm 14 bent at right angle with a width of approx. 1 mm larger in dimension than the diameter of the threaded shaft 12. The turn-type lock 13 can be twisted into the borehole 11 where the threaded shaft has e.g. a hexagonal opening 15 on its top, into which a hex key fits.

The turn-type lock 13 can be pivoted from its open position shown in FIG. 2, in which its arm 14 lies parallel on the edge of the channel 5, over the base arch 3 inserted into the channel 5 by turning the threaded shaft 12 by 90 degrees to the closed position shown in FIG. 3, whereby the funnel-shaped expansion is capped.

To fix the base arch 3 on the housing 2, the arm 14 has an elongated recess 16 on its surface facing the channel 5 that corresponds to the surface of the base arch 3, which envelops approx. one third of the curve of the base arch. The base arch is clamped in by adjusting the height of the turn-type lock 13.

The height of the turn-type lock 13 is adjusted with a clamping nut 21 which is used in an expansion 22 of the central borehole 11 and which has a female thread 23 which is fitted onto a male thread 24 of the threaded shaft 12. The clamping nut 21 is turned e.g. by an open-end wrench which fits into two openings 25 on the top of the clamping nut 21.

Insertion of the base arch 3 can be made even easier by stretching an alastic O-ring 31 (elastic) or loop etc. as an auxiliary device in the direction of channel 5 after it is put in. The rubber band is secured manually to two indicated brackets 32 and can be removed after the base arch 3 is securely fastened within the channel 5.

Figure 6:
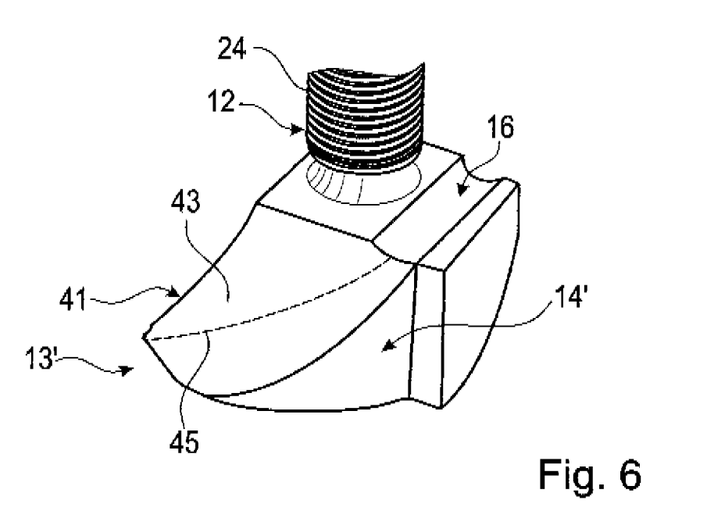
FIG. 6: a schematic perspective view of a modified turn-type lock to facilitate the insertion of the base arch in the channel of the housing of a function module.

Pursuant to FIG. 6, the base arch 3 can also be inserted more easily by means of a modified turn-type lock 13' with a modified arm 14' which is securely connected to the threaded shaft 12 by the male thread 24 of the turn-type lock 13' and turns with it. The arm 14' is designed so that it does not cover the channel 5 or the base arch when the turn-type lock 13 is placed in the open position, but only occurs when it is turned.

A continuously ascending coil 43 is positioned on the arm 14' in the form of a curved, shallow plane with a continuously ascending progression. The rotational direction of the lock 13' is selected such that the narrow anterior border of the coil 43 is always at the front. With this construction, the base arch 3 is brought towards and at least in part into the recess 16 and the channel 5 when the lock 13' is turned. In doing so, the contact surface between the base arch 3 and the shallow plane run in a quasi-diagonal line 45.

Once the base arch 3 can be inserted into the channel 5, the locking nut 21 is tightened after the pivoting bolt 13' is twisted into the closed position pursuant to FIG. 3 with the mentioned open-end wrench 21 until the base arch 3 is sitting securely within the channel 5 and fastened.

To move a tooth, the housing 2 has a short extension 51 with a female thread 52 in which a spindle 53 runs with a fine thread 54 which can be moved manually using a socket wrench, which is inserted into corresponding boreholes 55. An arm 58 is connected with an end piece 57 of the spindle 53 secured by a lock nut 56, which terminates in an end piece 59 snapped off at a right angle with a rectangular profile that conforms to the profile of the lingual lock on the molar (104 and 103 in FIG. 7).

The end piece 59 is inserted with a custom fit into a tube of the lock on the tooth. The arm 58 with the end piece 59 is fastened by sharply bending a tapered, curved extension 60 of the end piece 59, which protrudes from the lock after the end piece is inserted, as indicated by 60'.

Figure 8:
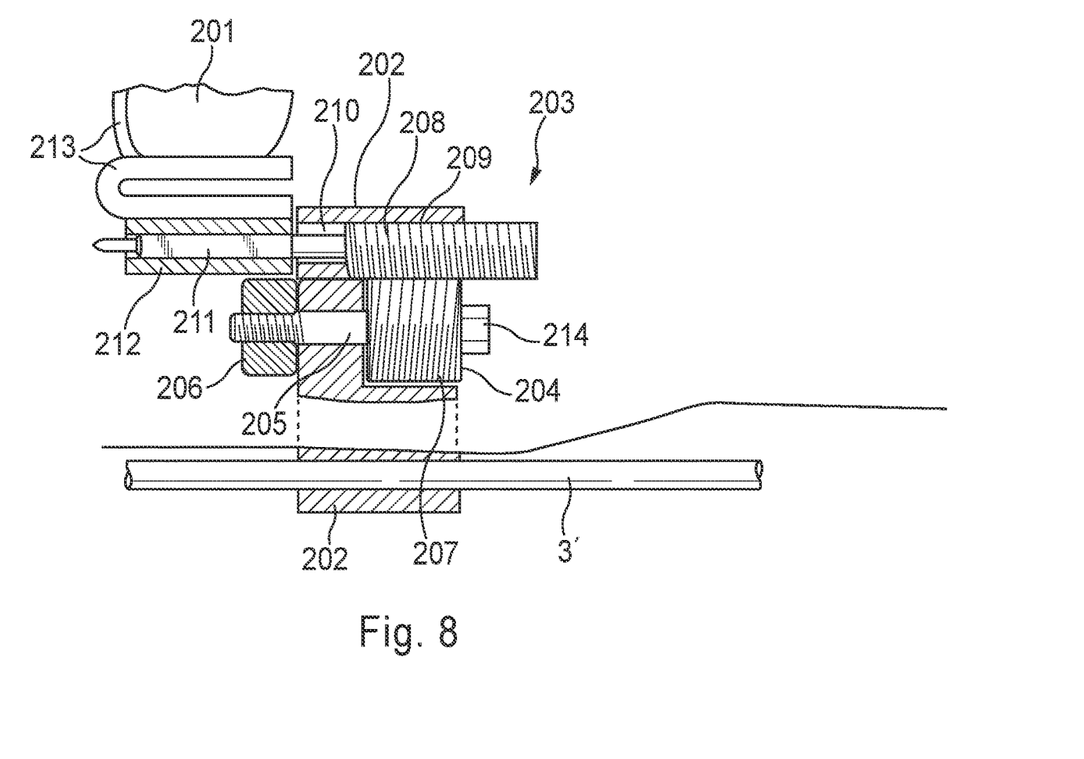
FIG. 8: a partial view of an additional implementation of a function module.

In FIG. 8 a worm gear unit 203 in a slightly modified housing 202 is provided as a linear actuator instead of a threaded shaft for moving an indicated tooth or molar 201. The housing is only partially depicted; in reality, the parts not shown do not necessarily lie within the image place. The housing 202 is fastened to the shown base arch 3' in a fashion similar to that described above.

The worm gear unit 203 has a worm wheel or worm screw 204 whose axle 205 is fastened within the housing 202 e.g by a lock nut 206. The worm screw 204 has a stationary worm thread 207 that is stationary but which can be freely turned into which a functionally tailored thread 208 of a threaded rod 209 is inserted. The threaded rod 209 is slide mounted in a borehole 210 of the housing 202; the axles of the two threads 207 and 208 are parallel, the features of the two threads match.

The end of the threaded rod 209 is constructed e.g. as a hexagonal bolt 211 which is inserted into a corresponding tube 212 and welded to it. The tube 212 is securely fastened with the tooth 201 in the customary way using a band or lock 213.

The worm screw 204 can be turned using a connection head 214 shaped such that is easily accessed from the front in terms of the mouth opening, e.g. with a screwdriver, an hex key, etc. As the threaded rod 209 cannot turn due to the form fit of the bolt 211 and tube 212 in the borehole 210, the rotation of the worm screw 204 is transformed into a feed motion or retrusive movement of the threaded rod 209, whereby the molar 201 is moved.

The advantage of a worm gear unit compared to a simple threaded rod as in the above example is that with the worm gear unit 203 small, precise adjustment tracks for the tooth 201 can be achieved. In addition, it is an advantage for the mechanics that, contrary to a spindle drive, the position of the connection head 214 does not change in the mouth of the patient. Thus, the accessibility of the connection head is always the same generally and also for the patient, if the patient is doing the adjustment themselves.

Incidentally, a threaded rod is not strictly necessary for the worm gear unit to move the tooth; instead, an e.g. rectangular rod rigidly guided into the housing can be employed that has toothing which engages with the threading of the worm screw.

What is claimed is:

1. A device for moving a patient's tooth or related group of teeth, comprising:
    a housing configured to be fastened within the patient's oral cavity on a base arch, wherein the base arch is adapted to be fastened at a fixed jaw implant that originates therefrom and runs, at least in part, along a tooth chain, wherein the housing comprises:
        an adjuster in the form of a linear actuator for moving the tooth, the adjustor including a connection between the adjustor and the tooth;
        a channel that can be freely accessed from the outside to insert the base arch; and
        a first lock for fastening the housing on the base arch, the first lock having a first position that allows the base arch to be inserted freely into the channel, and a second position that pulls and clamps the base arch into the channel thereby fastening the housing, wherein the first lock is height-adjustable and comprises:
            a press surface facing the channel and the base arch when inserted, and wherein the first lock conforms to the exterior shape of the base arch such that the base arch inserted into the channel is clamped firmly between the channel and the press surface by adjusting the height of the first lock;
        a threaded shaft with a male thread for adjusting the height, wherein the threaded shaft is incorporated within a borehole of the housing and comprises a clamping nut with a corresponding female thread, placed in the housing to press on the base wire within the channel; and
        an angled arm coupled to the threaded shaft which is operable to be tightened over the base arch inserted into the channel by twisting the threaded shaft and has a press surface to clamp the base arch by tightening the clamping nut.

2. The device of claim 1, wherein the press surface has a recess that conforms to the exterior shape of the base arch.

3. The device of claim 1, further comprising an auxiliary device that exerts a force on the device in the direction of the channel and at least temporarily holds the base arch in place, such that the auxiliary device facilitates the insertion of the base arch.

4. The device of claim 3, wherein the auxiliary device comprises an elastic ring which can be placed over the base arch and fastened onto brackets of the housing and thereby pull the base arch towards its final position within the channel.

5. The device of claim 4 wherein the adjuster comprises a threaded spindle warehoused in the housing to move the tooth.

6. The device of claim 4, wherein the adjuster comprises a worm gear unit situated in the housing and comprises a push rod that is configured to be connected with the tooth.

7. The device of claim 3, wherein the end of the connection to the first lock on the tooth to be moved has an end cap that can be inserted into the first lock with a custom fit which is extended by a tapered end cap projecting over the end of the first lock which is fastened by sharply bending the end cap in the first lock.

8. The device of claim 3 wherein the adjuster comprises a threaded spindle warehoused in the housing to move the tooth.

9. The device of claim 3, wherein the adjuster comprises a worm gear unit situated in the housing and comprises a push rod that is configured to be connected with the tooth.

* * * * *